(12) United States Patent
Akulshin et al.

(10) Patent No.: US 11,948,327 B2
(45) Date of Patent: Apr. 2, 2024

(54) METHOD AND SYSTEM FOR JOINT OBJECT LOCATION AND GROUND PLANE ESTIMATION IN COMPUTER VISION

(71) Applicant: Volvo Car Corporation, Gothenburg (SE)

(72) Inventors: Roman Akulshin, San Francisco, CA (US); Sihao Ding, Sunnyvale, CA (US)

(73) Assignee: Volvo Car Corporation, Gothenburg (SE)

( * ) Notice: Subject to any disclaimer, the term of this patent is extended or adjusted under 35 U.S.C. 154(b) by 507 days.

(21) Appl. No.: 17/340,228

(22) Filed: Jun. 7, 2021

(65) Prior Publication Data

US 2021/0383567 A1 Dec. 9, 2021

Related U.S. Application Data

(60) Provisional application No. 63/035,878, filed on Jun. 8, 2020.

(51) Int. Cl.
*G06T 7/73* (2017.01)
*G06T 7/11* (2017.01)
*G06T 7/80* (2017.01)

(52) U.S. Cl.
CPC .......... *G06T 7/73* (2017.01); *G06T 7/11* (2017.01); *G06T 7/80* (2017.01); *G06T 2207/10016* (2013.01); *G06T 2207/20081* (2013.01); *G06T 2207/30261* (2013.01); *G06T 2210/12* (2013.01)

(58) Field of Classification Search
CPC ..... G06T 7/73; G06T 7/11; G06T 7/80; G06T 2207/10016; G06T 2207/20081; G06T 2207/30261; G06T 2210/12; G06T 2207/20084; G06T 7/75; G06T 2207/30252
See application file for complete search history.

(56) References Cited

U.S. PATENT DOCUMENTS

2015/0103359 A1* 4/2015 Barbier ............. G01S 17/46
356/614
2015/0317821 A1* 11/2015 Ding ............... G06T 7/60
345/420

OTHER PUBLICATIONS

Zhang et al., A Flexible New Technique for Camera Calibration, Article, Dec. 2, 1998, Microsoft Research Microsoft Corporation, Redmond, WA 98052.

* cited by examiner

*Primary Examiner* — Molly Wilburn
(74) *Attorney, Agent, or Firm* — Clements Bernard Walker; Christopher L. Bernard

(57) ABSTRACT

A method and system by which a bounding box disposed around a segmented object in a camera (or other perception sensor) 2D image can be used to produce an estimate for both the location of the object—its position relative to the position of the camera that obtained the image (i.e., translation)—and the angle of rotation of the surface that the object is located on. The method and system may be used by an advanced driver assistance system (ADAS), an autonomous driving (AD) system, or the like. The input includes a simple camera (or other perception sensor) 2D image, with the ego vehicle generating 2D or 3D bounding boxes for objects detected at the scene. The output includes, for each object, its estimated distance from the ego vehicle camera/perception sensor and the angle of rotation of the surface underneath the object relative to the surface underneath the ego vehicle.

20 Claims, 6 Drawing Sheets

METHOD AND SYSTEM FOR JOINT OBJECT LOCATION AND GROUND PLANE ESTIMATION IN COMPUTER VISION

CROSS-REFERENCE TO RELATED APPLICATION

The present disclosure claims the benefit of priority of U.S. Provisional Patent Application No. 63/035,878, filed on Jun. 8, 2020, and entitled "METHOD AND SYSTEM FOR JOINT OBJECT LOCATION AND GROUND PLANE ESTIMATION IN COMPUTER VISION," the contents of which are incorporated in full by reference herein.

TECHNICAL FIELD

The present disclosure relates generally to the automotive and computer vision fields. More particularly, the present disclosure relates to a method and system for joint object location and ground plane estimation in computer vision.

BACKGROUND

Related to computer vision, most conventional simultaneous mapping and location (SLAM) systems assume a flat horizontal plane underneath all objects, which is often not true in practice. This introduces undesirable error into estimates and subsequent information utilization. In vehicle applications, what is desired is a computationally-efficient, non-deep learning (NDL) methodology for estimating the location and rotation of objects from camera data, for rapid onboard processing in an ego vehicle. The rotation of an object effectively provides the vehicle with an angle of the ground plane on which an object is positioned. This would result in the increased accuracy of object location. Further, ground plane angles could be estimated for multiple locations and used to build an interpolated three-dimensional (3D) surface map, for example. Preferably, such a methodology does not necessarily rely on Lidar data or the like, as not all vehicles are equipped with Lidar sensors or the like.

This background provides an exemplary context and environment in which the methods and systems of the present disclosure may be implemented. It will be readily apparent to those of ordinary skill in the art that the methods and systems of the present disclosure may be implemented in other contexts and environments equally.

SUMMARY

The present disclosure provides a method and system by which a bounding box disposed around a detected object in a camera (or other perception sensor) two-dimensional (2D) image can be used to produce an estimate for both the location of the object—its position relative to the position of the camera that obtained the image (i.e., translation)—and the angle of rotation of the surface that the object is located on. In a vehicle application, the object may be a vehicle, a building, a cyclist, a pedestrian, etc., and the bounding box may be placed using a deep learning (DL)-based approach or the like. The method and system may be used by an advanced driver assistance system (ADAS), an autonomous driving (AD) system, or the like, providing a vehicle's control system with information about the vehicle's surroundings. Thus, the input includes a simple camera (or other perception sensor) 2D image, with the ego vehicle generating 2D or 3D bounding boxes for objects detected at the scene. The output includes, for each object, its estimated distance from the ego vehicle camera (or other perception sensor) and the angle of rotation of the surface underneath the object relative to the surface underneath the ego vehicle.

In one exemplary embodiment, the present disclosure provides a method, including: obtaining an image using one of a camera and a perception sensor; detecting and disposing bounding boxes around the object in the image; generating a reference cube, wherein the reference cube is assumed to be disposed at a center of a coordinate system associated with the one or more of the camera and the perception sensor, and wherein the reference cube is a model to which a projection matrix associated with the bounding boxes indicating rotation and translation in three dimensions is applied; projecting corners of the reference cube to respective corners of the bounding boxes; calculating reference cube-to-object homographies for front and back faces of the bounding boxes using a direct linear transformation; performing nonlinear least squares optimization for the reference cube-to-object homographies; recovering rotation angles and translation distances for the object and combining them to form final homographies for the front and back faces of the bounding boxes around the object; and applying an inverse of the camera or perception sensor calibration matrix to the final homographies to recover a true rotation and translation of the object.

In another exemplary embodiment, the present disclosure provides a non-transitory computer-readable medium including instructions stored in a memory and executed by a processor to carry out the steps including: obtaining an image using one of a camera and a perception sensor; detecting and disposing bounding boxes around the object in the image; generating a reference cube, wherein the reference cube is assumed to be disposed at a center of a coordinate system associated with the one or more of the camera and the perception sensor, and wherein the reference cube is a model to which a projection matrix associated with the bounding boxes indicating rotation and translation in three dimensions is applied; projecting corners of the reference cube to respective corners of the bounding boxes; calculating reference cube-to-object homographies for front and back faces of the bounding boxes using a direct linear transformation; performing nonlinear least squares optimization for the reference cube-to-object homographies; recovering rotation angles and translation distances for the object and combining them to form final homographies for the front and back faces of the bounding boxes around the object; and applying an inverse of the camera or perception sensor calibration matrix to the final homographies to recover a true rotation and translation of the object.

In a further exemplary embodiment, the present disclosure provides a system, including: one of a camera and a perception sensor operable for obtaining an image; and a memory storing instructions executed by a processor to perform the steps including: detecting and disposing bounding boxes around the object in the image; generating a reference cube, wherein the reference cube is assumed to be disposed at a center of a coordinate system associated with the one or more of the camera and the perception sensor, and wherein the reference cube is a model to which a projection matrix associated with the bounding boxes indicating rotation and translation in three dimensions is applied; projecting corners of the reference cube to respective corners of the bounding boxes; calculating reference cube-to-object homographies for front and back faces of the bounding boxes using a direct linear transformation; performing nonlinear least squares optimization for the reference cube-to-object homographies; recovering rotation angles and translation distances for the object and combining them to form final homographies for the front and back faces of the bounding boxes around the object; and applying an inverse of the camera or perception sensor calibration matrix to the final homographies to recover a true rotation and translation of the object.

BRIEF DESCRIPTION OF THE DRAWINGS

The present disclosure is illustrated and described herein with reference to the various drawings, in which like reference numbers are used to denote like system components/method steps, and in which:

FIG. 5 is a block diagram of a server which may be used in the cloud-based system of FIG. 4 or the like; and FIG. 6 is a block diagram of a user device which may be used in the cloud-based system of FIG. 4 or the like.

DESCRIPTION OF EMBODIMENTS

Again, the present disclosure provides a method and system by which a bounding box disposed around a detected object in a camera (or other perception sensor) 2D image can be used to produce an estimate for both the location of the object—its position relative to the position of the camera that obtained the image (i.e., translation)—and the angle of rotation of the surface that the object is located on. In a vehicle application, the object may be a vehicle, a building, a cyclist, a pedestrian, etc., and the bounding box may be placed using a DL-based approach or the like. The method and system may be used by an ADAS, an AD system, or the like, providing a vehicle's control system with information about the vehicle's surroundings. Thus, the input includes a simple camera (or other perception sensor) 2D image, with the ego vehicle generating 2D or 3D bounding boxes for objects detected at the scene. The output includes, for each object, its estimated distance from the ego vehicle camera (or other perception sensor) and the angle of rotation of the surface underneath the object relative to the surface underneath the ego vehicle.

Figure 1:
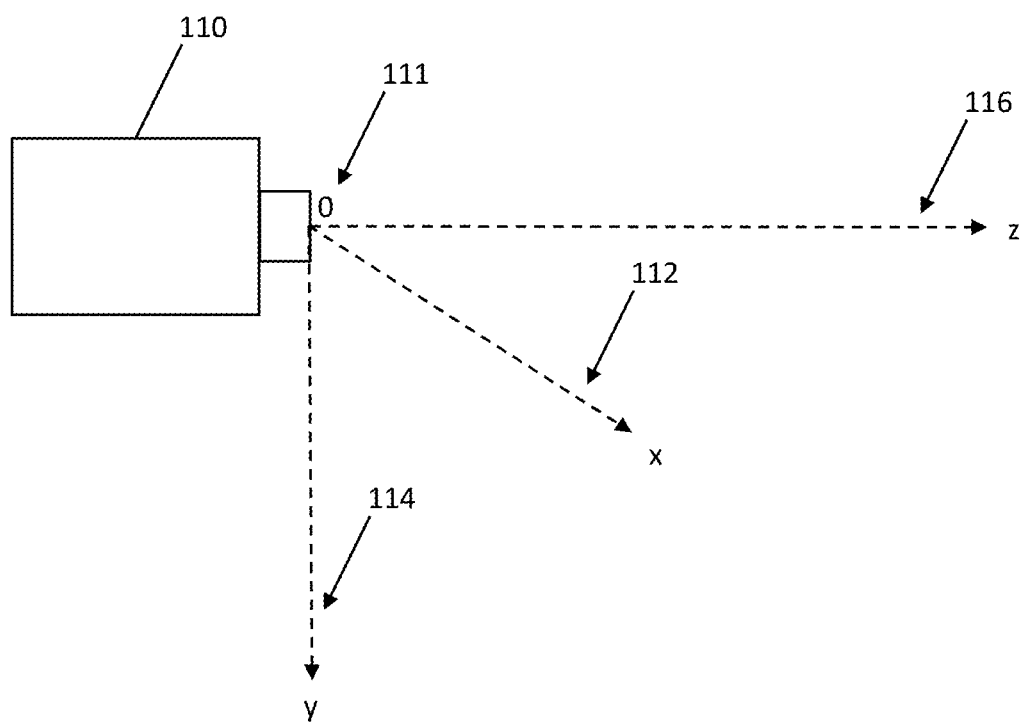
FIG. 1 is a schematic diagram illustrating the 3D coordinate system of the present disclosure.

Referring now specifically to FIG. 1, the 3D coordinate system of the present disclosure is defined with respect to an origin (0) 111 defined at the camera (or other perception sensor) 110 used to obtain the object image utilized. The x-axis 112 measures the distance to the left or right of the camera 110, parallel to the surface disposed underneath the camera 110. The y-axis 114 measures the distance above or below the camera 110, perpendicular to the surface disposed underneath the camera 110. The z-axis 116 measures the distance away from the camera 110, parallel to the surface disposed underneath the camera 110.

As used herein, in general, a bounding box may be a rectangle (in 2D) or a cuboid (in 3D) that encloses a detected object in an image. A camera calibration matrix (i.e., intrinsic matrix) is a 3×3 matrix that describes the physical parameters of a camera, including focal distance, camera sensor scale in the x and y directions, and the x and y positions of image center relative to the coordinate system. Rotation refers to the rotation of an object about the x, y, and z axes. Translation refers to the movement of an object in space in the x, y, and z directions. Homography, in this context, refers to a 3×3 matrix that describes the combined transformation undergone by a 2D object when the effects of rotation, translation, and the camera calibration matrix are applied to it. A projection matrix refers to a 3×4 matrix that describes the combined effect of rotation and translation of an object, but does not include the effect of the camera calibration matrix.

The approach of the present disclosure is inspired by Zhang's method ("A Flexible New Technique for Camera Calibration," Zhengyou Zhang, 1998). Zhang's method, widely used in the industry (e.g., in OpenCV camera calibration), provides a method to estimate both the intrinsic camera parameters (i.e., the cameral calibration matrix) and the extrinsic projection (e.g., rotation and translation of the camera relative to an object). Zhang's algorithm uses several (i.e., at least two) 2D views of a planar calibration pattern, such as a chessboard, whose dimensions need to be either exactly known or assumed to be unit length per element, such as a chessboard square. Homographies from the calibration pattern object to its observed projection are calculated for each separate view of the object and then broken down into the intrinsic matrix (the same for all views) and the extrinsic matrices (one for each view). The present disclosure takes advantage of the fact that, here, one knows the calibration matrices of the ego vehicle's cameras and reconstructs the extrinsic matrices from the homographies for the detected objects.

In terms of assumptions, the present disclosure assumes that one already has the calibration matrix of the camera used for taking the image of the scene. The present disclosure assumes that the surface directly underneath the camera associated with the ego vehicle is flat; and all rotations and translations of objects detected in the scene are computed with respect to this reference flat surface. The present disclosure also assumes that an object's y-translation (i.e., vertical distance from the ground plane to the center of the object) is approximately equal to the camera's y-translation. This last assumption could be relaxed in an alternate embodiment.

Figure 2:
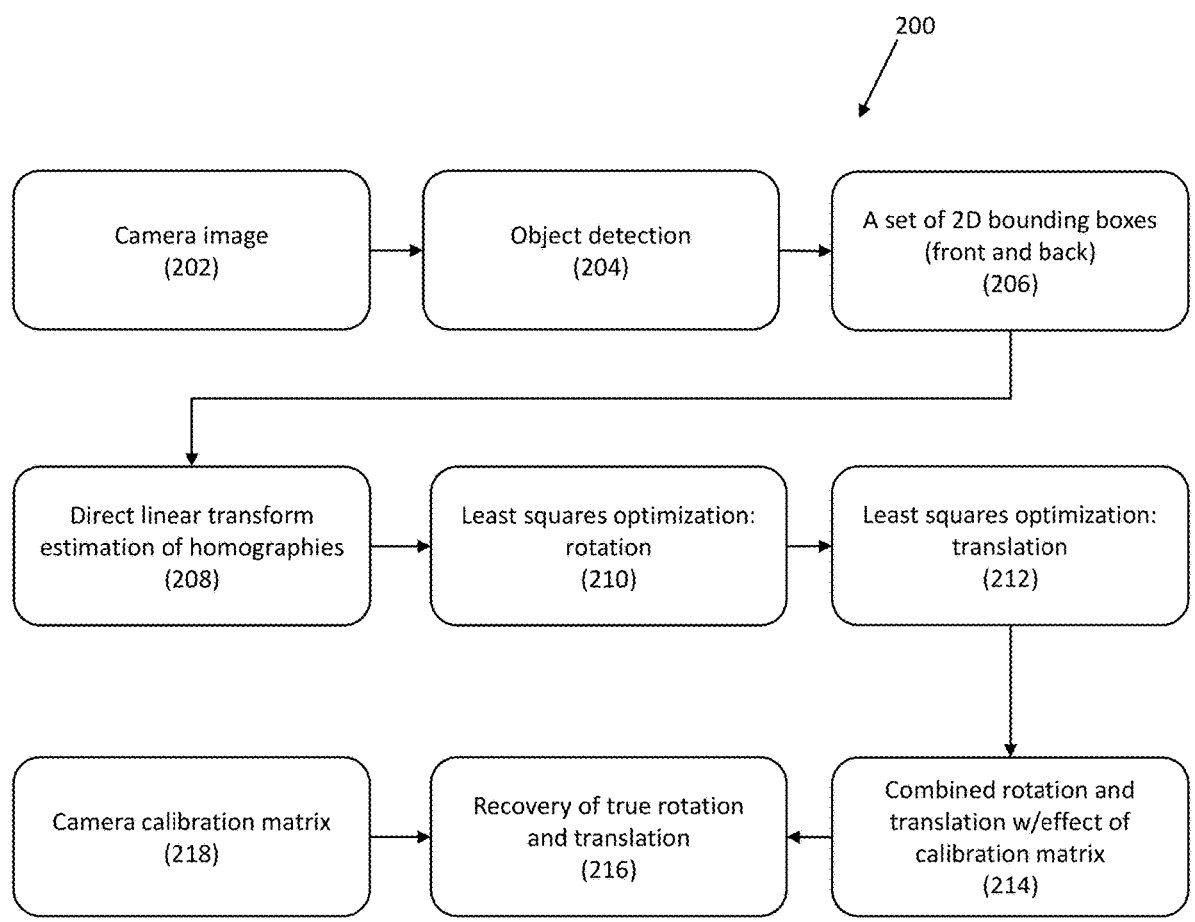
FIG. 2 is a schematic diagram illustrating one exemplary embodiment of the method and system for joint object location and ground plane estimation in computer vision of the present disclosure.

Referring now specifically to FIG. 2, in one exemplary embodiment, the method/system 200 includes, given a camera (or other perception sensor) 2D image 202, performing DL-based object detection (e.g., Single Shot MultiBox Detection (SSMD)) on a scene captured by the camera 204, which provides the coordinates for eight corners of 2D projections of the assumed 3D bounding boxes of the objects in the scene. A "reference cube" is generated 206—a cube in 3D that is assumed to be the model to which a projection matrix containing rotation and translation in 3D is applied, thereby transforming it into an object of the scene. The reference cube is assumed to be placed at the center of the coordinate system, which corresponds to the camera's position. The reference cube has a rotation of zero about all axes. The eight corners of the reference cube are assumed to be projected to the respective corners of the 2D bounding box of each object in the scene. The two initial reference cube-to-object homographies are calculated separately for the front and back face of each detected object using a direct linear transformation (i.e., solving a system of linear equations) 208, assuming at the current stage that the reference cube stays a cube, i.e. no adjustments to its scale ratio are made. These initial homographies will be imprecise, but they provide a good starting point for the following step.

The initial homographies for each object are further refined using $1^{st}$-stage nonlinear least squares optimization 210 and 212—a process of repeatedly adjusting the homographies with the goal of minimizing the projection error. The projection error here is the difference between the 2D bounding boxes detected by the object detection algorithm in stage 1 and the estimates given by the homographies. Again, homographies for the front face and the back face of the reference cube are refined separately for each object. In this step, rotation angles are recovered for each object. During the $2^{nd}$-stage nonlinear least squares optimization, the homographies for each object are now refined jointly, with xy-scale provided as an adjustable parameter for the reference cube, allowing for rectangular, rather than square, projections. This stage provides the x, y, and z translations for each object. Rotations and translations from the previous two steps are combined to form two final homographies for the front and back faces of the bounding box around each object 214. The final homographies still include the effect of the camera's calibration matrix on the projection. Finally, true rotation and translation are recovered from each pair of final homographies 216 by averaging their effect and applying the inverse of the calibration matrix 218.

Figure 3:
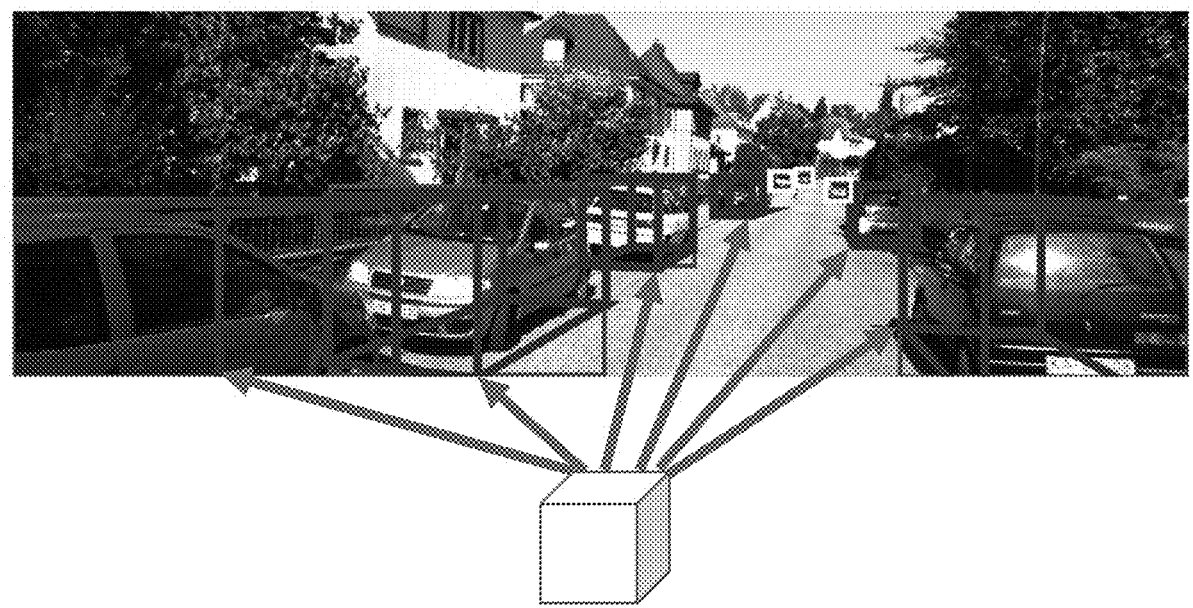
FIG. 3 is a schematic diagram illustrating the operation of the method and system for joint object location and ground plane estimation in computer vision of the present disclosure in an example scene.

FIG. 3 is a schematic diagram illustrating the operation of the method and system for joint object location and ground plane estimation in computer vision 200 (FIG. 2) of the present disclosure in an example scene. A total of six cars, each having a different rotation and translation relative to the camera, are enclosed in bounding boxes, which are the result of running an object detection process on the source image. For each car, the entire process of determining the rotation and translation is performed independently; one projection matrix is created for each object for one scene (i.e., a static moment in time). Each car is therefore assumed to be a projection of a reference cube. Since the reference cube is centered at the camera's position and has zero rotation, the projection matrix for each car describes the rotation and translation of the car's bounding box relative to the camera and therefore relative to the ego vehicle. As the system develops, bounding boxes will be used for each separate object, not just in one static scene, but multiple sequential scenes over time. This will provide a higher accuracy of estimates, because one will know that the object has constant dimensions, used across all scenes. One can also determine a set of reference cuboids for each class of object (i.e., car, pedestrian, etc.)—similar to anchor boxes. At the detection stage, one can save the best anchor box for each detected object to assist in approximating the y-translation, and then refine the reference cube's aspect ratio using projections of the same object over multiple sequential scenes.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Figure 4:
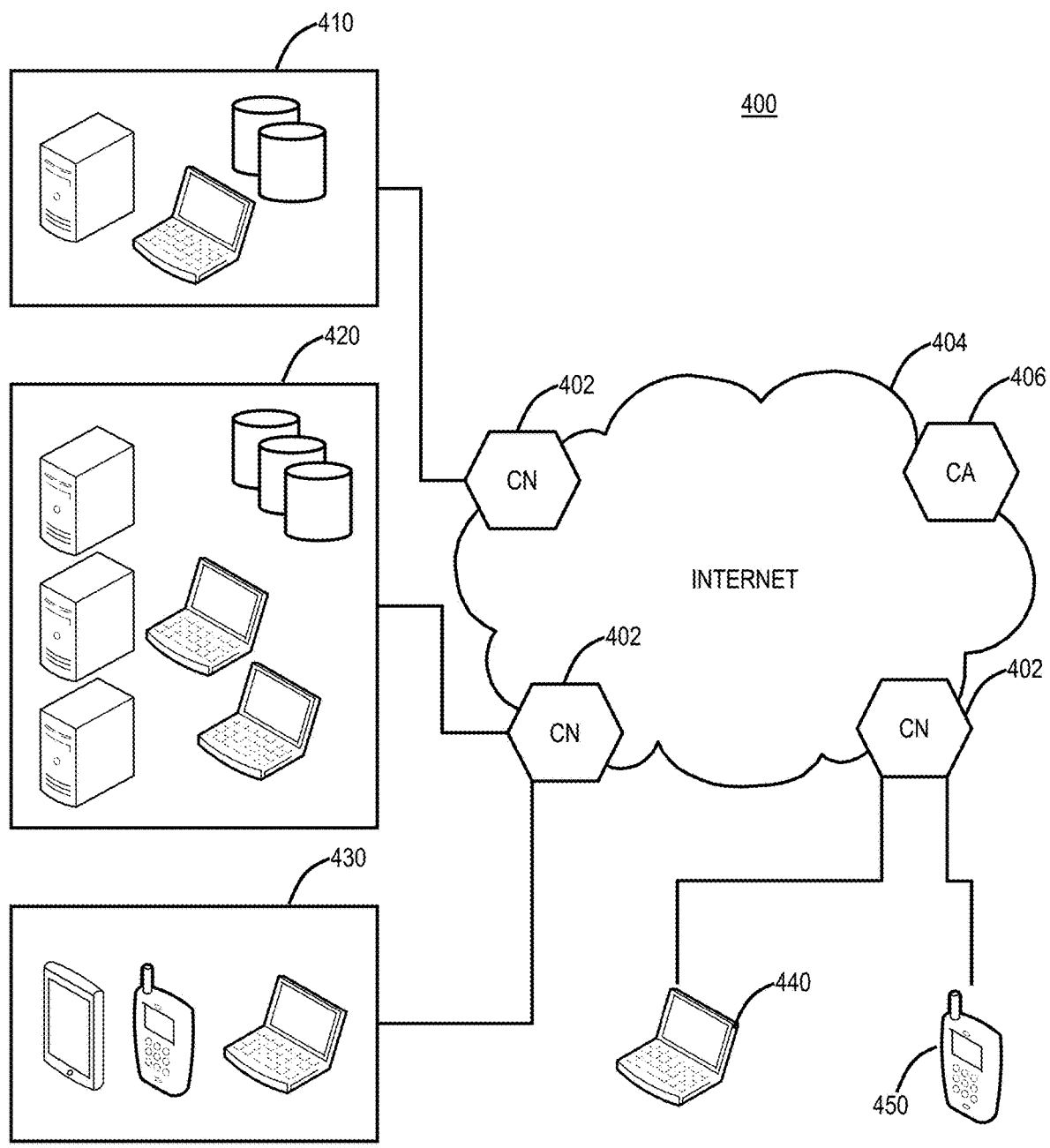
FIG. 4 is a network diagram of a cloud-based system for implementing various cloud-based services of the present disclosure.
Figure 5:
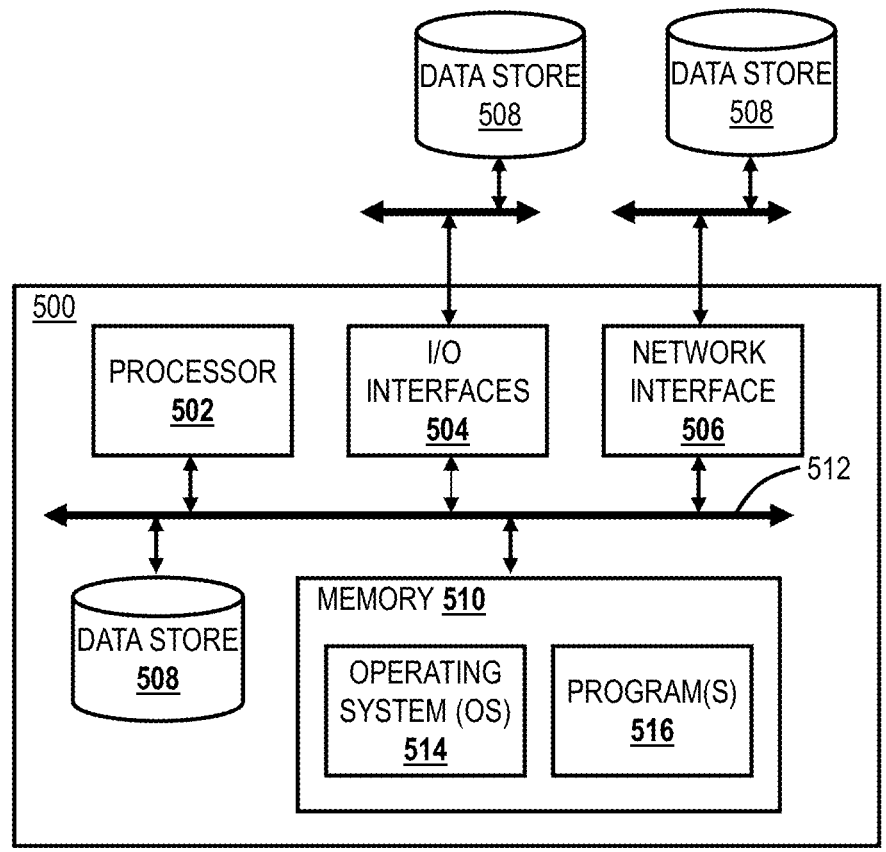

FIG. 4 is a network diagram of a cloud-based system 400 for implementing various cloud-based services of the present disclosure. The cloud-based system 400 includes one or more cloud nodes (CNs) 402 communicatively coupled to the Internet 404 or the like. The cloud nodes 402 may be implemented as a server 500 (as illustrated in FIG. 5) or the like and can be geographically diverse from one another, such as located at various data centers around the country or globe. Further, the cloud-based system 400 can include one or more central authority (CA) nodes 406, which similarly can be implemented as the server 500 and be connected to the CNs 402. For illustration purposes, the cloud-based system 400 can connect to a regional office 410, headquarters 420, various employee's homes 430, laptops/desktops 440, and mobile devices 450, each of which can be communicatively coupled to one of the CNs 402. These locations 410, 420, and 430, and devices 440 and 450 are shown for illustrative purposes, and those skilled in the art will recognize there are various access scenarios to the cloud-based system 400, all of which are contemplated herein. The devices 440 and 450 can be so-called road warriors, i.e., users off-site, on-the-road, etc. The cloud-based system 400 can be a private cloud, a public cloud, a combination of a private cloud and a public cloud (hybrid cloud), or the like.

Again, the cloud-based system 400 can provide any functionality through services such as software-as-a-service (SaaS), platform-as-a-service, infrastructure-as-a-service, security-as-a-service, Virtual Network Functions (VNFs) in a Network Functions Virtualization (NFV) Infrastructure (NFVI), etc. to the locations 410, 420, and 430 and devices 440 and 450. Previously, the Information Technology (IT) deployment model included enterprise resources and applications stored within an enterprise network (i.e., physical devices), behind a firewall, accessible by employees on site or remote via Virtual Private Networks (VPNs), etc. The cloud-based system 400 is replacing the conventional deployment model. The cloud-based system 400 can be used to implement these services in the cloud without requiring the physical devices and management thereof by enterprise IT administrators.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application necessarily required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 400 is illustrated herein as one example embodiment of a cloud-based system, and those of ordinary skill in the art will recognize the systems and methods described herein are not necessarily limited thereby.

FIG. 5 is a block diagram of a server 500, which may be used in the cloud-based system 400 (FIG. 4), in other systems, or standalone. For example, the CNs 402 (FIG. 4) and the central authority nodes 406 (FIG. 4) may be formed as one or more of the servers 500. The server 500 may be a digital computer that, in terms of hardware architecture, generally includes a processor 502, input/output (I/O) interfaces 504, a network interface 506, a data store 508, and memory 510. It should be appreciated by those of ordinary skill in the art that FIG. 5 depicts the server 500 in an oversimplified manner, and a practical embodiment may include additional components and suitably configured processing logic to support known or conventional operating features that are not described in detail herein. The components (502, 504, 506, 508, and 510) are communicatively coupled via a local interface 512. The local interface 512 may be, for example, but is not limited to, one or more buses or other wired or wireless connections, as is known in the art. The local interface 512 may have additional elements, which are omitted for simplicity, such as controllers, buffers (caches), drivers, repeaters, and receivers, among many others, to enable communications. Further, the local interface 512 may include address, control, and/or data connections to enable appropriate communications among the aforementioned components.

The processor 502 is a hardware device for executing software instructions. The processor 502 may be any custom made or commercially available processor, a central processing unit (CPU), an auxiliary processor among several processors associated with the server 500, a semiconductor-based microprocessor (in the form of a microchip or chipset), or generally any device for executing software instructions. When the server 500 is in operation, the processor 502 is configured to execute software stored within the memory 510, to communicate data to and from the memory 510, and to generally control operations of the server 500 pursuant to the software instructions. The I/O interfaces 504 may be used to receive user input from and/or for providing system output to one or more devices or components.

The network interface 506 may be used to enable the server 500 to communicate on a network, such as the Internet 404 (FIG. 4). The network interface 506 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 506 may include address, control, and/or data connections to enable appropriate communications on the network. A data store 508 may be used to store data. The data store 508 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 508 may incorporate electronic, magnetic, optical, and/or other types of storage media. In one example, the data store 508 may be located internal to the server 500, such as, for example, an internal hard drive connected to the local interface 512 in the server 500. Additionally, in another embodiment, the data store 508 may be located external to the server 500 such as, for example, an external hard drive connected to the I/O interfaces 504 (e.g., a SCSI or USB connection). In a further embodiment, the data store 508 may be connected to the server 500 through a network, such as, for example, a network-attached file server.

The memory 510 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 510 may incorporate electronic, magnetic, optical, and/or other types of storage media. Note that the memory 510 may have a distributed architecture, where various components are situated remotely from one another but can be accessed by the processor 502. The software in memory 510 may include one or more software programs, each of which includes an ordered listing of executable instructions for implementing logical functions. The software in the memory 510 includes a suitable operating system (O/S) 514 and one or more programs 516. The operating system 514 essentially controls the execution of other computer programs, such as the one or more programs 516, and provides scheduling, input-output control, file and data management, memory management, and communication control and related services. The one or more programs 516 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 6:
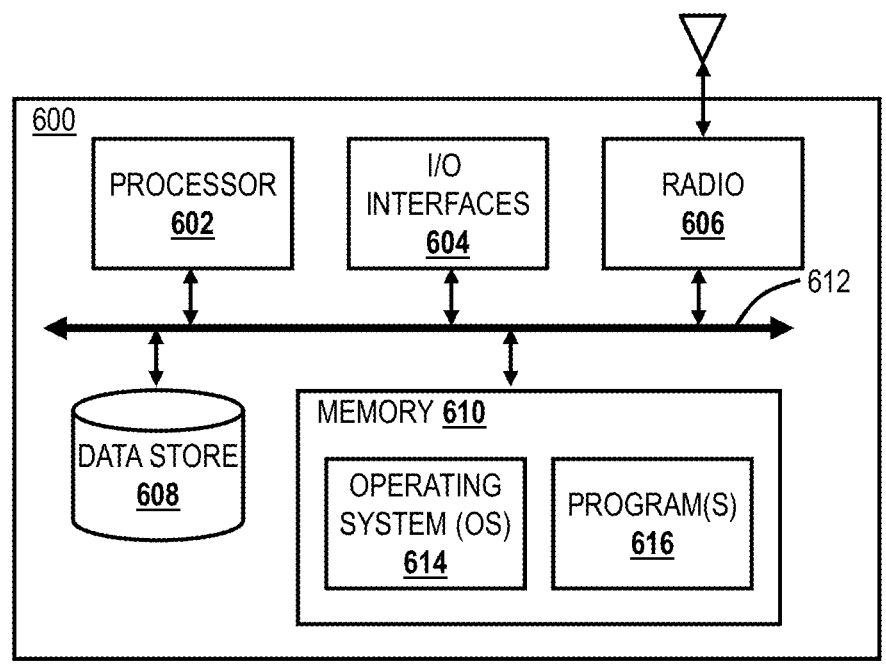

FIG. 6 is a block diagram of a user device 600, which may be used in the cloud-based system 400 (FIG. 4) or the like. Again, the user device 600 can be a smartphone, a tablet, a smartwatch, an Internet of Things (IoT) device, a laptop, a virtual reality (VR) headset, etc. The user device 600 can be a digital device that, in terms of hardware architecture, generally includes a processor 602, I/O interfaces 604, a radio 606, a data store 608, and memory 610. It should be appreciated by those of ordinary skill in the art that FIG. 6 depicts the user device 600 in an oversimplified manner, and a practical embodiment may include additional components and suitably configured processing logic to support known or conventional operating features that are not described in detail herein. The components (602, 604, 606, 608, and 610) are communicatively coupled via a local interface 612. The local interface 612 can be, for example, but is not limited to, one or more buses or other wired or wireless connections, as is known in the art. The local interface 612 can have additional elements, which are omitted for simplicity, such as controllers, buffers (caches), drivers, repeaters, and receivers, among many others, to enable communications. Further, the local interface 612 may include address, control, and/or data connections to enable appropriate communications among the aforementioned components.

The processor 602 is a hardware device for executing software instructions. The processor 602 can be any custom made or commercially available processor, a CPU, an auxiliary processor among several processors associated with the user device 600, a semiconductor-based microprocessor (in the form of a microchip or chipset), or generally any device for executing software instructions. When the user device 600 is in operation, the processor 602 is configured to execute software stored within the memory 610, to communicate data to and from the memory 610, and to generally control operations of the user device 600 pursuant to the software instructions. In an embodiment, the processor 602 may include a mobile optimized processor such as optimized for power consumption and mobile applications. The I/O interfaces 604 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like.

The radio 606 enables wireless communication to an external access device or network. Any number of suitable wireless data communication protocols, techniques, or methodologies can be supported by the radio 606, including any protocols for wireless communication. The data store 608 may be used to store data. The data store 608 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

Again, the memory 610 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 610 may incorporate electronic, magnetic, optical, and/or other types of storage media. Note that the memory 610 may have a distributed architecture, where various components are situated remotely from one another, but can be accessed by the processor 602. The software in memory 610 can include one or more software programs, each of which includes an ordered listing of executable instructions for implementing logical functions. In the example of FIG. 6, the software in the memory 610 includes a suitable operating system 614 and programs 616. The operating system 614 essentially controls the execution of other computer programs and provides scheduling, input-output control, file and data management, memory management, and communication control and related services. The programs 616 may include various applications, add-ons, etc. configured to provide end user functionality with the user device 600. For example, example programs 616 may include, but not limited to, a web browser, social networking applications, streaming media applications, games, mapping and location applications, electronic mail applications, financial applications, and the like. In a typical example, the end-user typically uses one or more of the programs 616 along with a network such as the cloud-based system 400 (FIG. 4).

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A method, comprising:
   obtaining an image using one of a camera and a perception sensor;
   detecting and disposing one or more bounding boxes around the object in the image;
   generating a reference cube, wherein the reference cube is assumed to be disposed at a center of a coordinate system associated with the one or more of the camera and the perception sensor, and wherein the reference cube is a model to which a projection matrix associated with the one or more bounding boxes indicating rotation and translation in three dimensions is applied;
   projecting corners of the reference cube to respective corners of the one or more bounding boxes;
   calculating reference cube-to-object homographies for front and back faces of the one or more bounding boxes using a direct linear transformation;
   performing nonlinear least squares optimization for the reference cube-to-object homographies;
   recovering rotation angles and translation distances for the object and combining them to form final homographies for the front and back faces of the one or more bounding boxes around the object; and
   applying an inverse of a camera or perception sensor calibration matrix to an average of the final homographies to recover a true rotation and translation of the object.

2. The method of claim 1, wherein projecting the corners of the reference cube to the respective corners of the one or more bounding boxes comprises projecting the corners of the reference cube to respective corners of bounding boxes disposed at the front and back faces of a bounding cuboid around the object.

3. The method of claim 1, wherein performing the nonlinear least squares optimization for the reference cube-to-object homographies minimizes error associated with projecting the corners of the reference cube to the respective corners of the one or more bounding boxes.

4. The method of claim 1, wherein, prior to applying the inverse of the camera or perception sensor calibration matrix to the average of the final homographies, the final homographies include effects of the calibration matric of the camera or perception sensor.

5. The method of claim 1, further comprising, using the true rotation and translation of the object, outputting an estimated distance of the object from the one of the camera and the perception sensor.

6. The method of claim 1, further comprising, using the true rotation and translation of the object, outputting an angle of rotation of a surface underneath the object relative to the surface underneath an ego vehicle associated with the one of the camera and the perception sensor.

7. The method of claim 1, wherein the method is implemented as part of one of an advanced driver assistance system and an autonomous driving system.

8. A non-transitory computer-readable medium comprising instructions stored in a memory and executed by a processor to carry out the steps comprising:
   obtaining an image using one of a camera and a perception sensor;
   detecting and disposing one or more bounding boxes around the object in the image;
   generating a reference cube, wherein the reference cube is assumed to be disposed at a center of a coordinate system associated with the one or more of the camera and the perception sensor, and wherein the reference cube is a model to which a projection matrix associated with the one or more bounding boxes indicating rotation and translation in three dimensions is applied;
   projecting corners of the reference cube to respective corners of the one or more bounding boxes;
   calculating reference cube-to-object homographies for front and back faces of the one or more bounding boxes using a direct linear transformation;
   performing nonlinear least squares optimization for the reference cube-to-object homographies;
   recovering rotation angles and translation distances for the object and combining them to form final homographies for the front and back faces of the one or more bounding boxes around the object; and
   applying an inverse of a camera or perception sensor calibration matrix to an average of the final homographies to recover a true rotation and translation of the object.

9. The non-transitory computer-readable medium of claim 8, wherein projecting the corners of the reference cube to the respective corners of the one or more bounding boxes comprises projecting the corners of the reference cube to respective corners of bounding boxes disposed at the front and back faces of a bounding cuboid around the object.

10. The non-transitory computer-readable medium of claim 8, wherein performing the nonlinear least squares optimization for the reference cube-to-object homographies minimizes error associated with projecting the corners of the reference cube to the respective corners of the one or more bounding boxes.

11. The non-transitory computer-readable medium of claim 8, wherein, prior to applying the inverse of the camera or perception sensor calibration matrix to the average of the final homographies, the final homographies include effects of the calibration matric of the camera or perception sensor.

12. The non-transitory computer-readable medium of claim 8, the steps further comprising, using the true rotation and translation of the object, outputting an estimated distance of the object from the one of the camera and the perception sensor.

13. The non-transitory computer-readable medium of claim 8, the steps further comprising, using the true rotation and translation of the object, outputting an angle of rotation of a surface underneath the object relative to the surface underneath an ego vehicle associated with the one of the camera and the perception sensor.

14. The non-transitory computer-readable medium of claim 8, wherein the processor is part of one of an advanced driver assistance system and an autonomous driving system.

15. A system, comprising:
   one of a camera and a perception sensor operable for obtaining an image; and
   a memory storing instructions executed by a processor to perform the steps comprising:
      detecting and disposing one or more bounding boxes around the object in the image;
      generating a reference cube, wherein the reference cube is assumed to be disposed at a center of a coordinate system associated with the one or more of the camera and the perception sensor, and wherein the reference cube is a model to which a projection matrix associated with the one or more bounding boxes indicating rotation and translation in three dimensions is applied;
      projecting corners of the reference cube to respective corners of the one or more bounding boxes;
      calculating reference cube-to-object homographies for front and back faces of the one or more bounding boxes using a direct linear transformation;
      performing nonlinear least squares optimization for the reference cube-to-object homographies;
      recovering rotation angles and translation distances for the object and combining them to form final homographies for the front and back faces of the one or more bounding boxes around the object; and
      applying an inverse of a camera or perception sensor calibration matrix to an average of the final homographies to recover a true rotation and translation of the object.

16. The system of claim 15, wherein projecting the corners of the reference cube to the respective corners of the one or more bounding boxes comprises projecting the corners of the reference cube to respective corners of bounding boxes disposed at the front and back faces of a bounding cuboid around the object.

17. The system of claim 15, wherein performing the nonlinear least squares optimization for the reference cube-to-object homographies minimizes error associated with projecting the corners of the reference cube to the respective corners of the one or more bounding boxes.

18. The system of claim 15, wherein, prior to applying the inverse of the camera or perception sensor calibration matrix to the average of the final homographies, the final homographies include effects of the calibration matric of the camera or perception sensor.

19. The system of claim 15, the steps further comprising, using the true rotation and translation of the object, outputting an estimated distance of the object from the one of the camera and the perception sensor.

20. The system of claim 15, the steps further comprising, using the true rotation and translation of the object, outputting an angle of rotation of a surface underneath the object relative to the surface underneath an ego vehicle associated with the one of the camera and the perception sensor.

* * * * *